United States Patent [19]

Barner et al.

[11] 3,771,137

[45] Nov. 6, 1973

[54] MEMORY CONTROL IN A MULTIPURPOSE SYSTEM UTILIZING A BROADCAST

[75] Inventors: Robert Paul Barner, Silver Spring; John Anton Deveer, Olney; Jan Gustav Oblonsky, Brookville, all of Md.

[73] Assignee: International Business Machines Corporation, Armonk, N.Y.

[22] Filed: Sept. 10, 1971

[21] Appl. No.: 179,376

[52] U.S. Cl. .......... 340/172.5
[51] Int. Cl. .......... G06f 15/16
[58] Field of Search .......... 340/172.5

[56] References Cited

UNITED STATES PATENTS

| | | | |
|---|---|---|---|
| 3,445,822 | 5/1969 | Driscoll | 340/172.5 |
| 3,611,315 | 10/1971 | Kokubunji-shi et al. | 340/172.5 |
| 3,618,040 | 11/1971 | Kokubunji-shi et al. | 340/172.5 |
| 3,581,291 | 5/1971 | Iwamoto et al. | 340/172.5 |
| 3,061,192 | 10/1962 | Terzian | 340/172.5 |

*Primary Examiner*—Paul J. Henon
*Assistant Examiner*—Michael Sachs
*Attorney*—J. Jancin, Jr. et al.

[57] ABSTRACT

In a multiprocessing computer where a plurality of processors, each with its own buffer memory, share a main memory, a broadcast system provides each processor the capability to query each other processor to determine whether a modified (e.g. updated) version of the desired data is located in another processor's buffer memory. The memory control unit simultaneously initiates a main memory read cycle and a broadcast signal in response to a request for data. If a modified version of the data is found to be in a buffer memory, it is transferred to the main memory by the control unit. The main memory read cycle is then changed to a write cycle so that the modified version replaces the original data. The modified data is then switched onto the memory data bus and transmitted to the requesting processor. Using this system, which only allows one buffer to contain a modified version of any data item, the requesting processor obtains the most current data in one main memory cycle in such a manner that it appears that the data is originating from main memory.

13 Claims, 6 Drawing Figures

INVENTORS
ROBERT P. BARNER
JOHN A. de VEER
JAN G. OBLONSKY
BY
I. Tancin Jr.
ATTORNEY

MEMORY CONTROL IN A MULTIPURPOSE SYSTEM UTILIZING A BROADCAST

BACKGROUND

This invention relates to computer systems and more specifically to a memory control system in a multiprocessing computer wherein each processor is provided with a buffer memory.

In a data processing system that utilizes a buffer memory, information from the main memory may be stored in the buffer memory as well as in the main memory. When the processor requests new data, the system first checks the buffer memory to determine whether it is available, and if it is, the data is provided to the processor. In the event that the data is not available in the buffer memory the data is retrieved from the main memory. When this concept of maintaining data in a plurality of storage devices is extended to a system where there are multiple users of the common main storage problems arise as to the current validity of data within a particular storage device. This problem may occur where multiple users such as a uniprocessor with a buffer memory and its associated input/output (I/O) channels share a common main memory, as well as in a multiprocessing system with a plurality of processors, each with its own buffer memory all sharing a common main memory.

Several techniques have been developed to overcome this problem and to insure that only the most current data is provided to the requesting user.

One technique for solving this problem has been to provide a validity bit for each portion of data stored within each buffer memory. When the data is updated (modified) in any buffer a write cycle is executed into main memory to update the main memory version of the data. In addition to updating, the data in main memory, the validity bit of this data is made invalid in all of the other buffer memories in which this data is resident. In this manner, the other processors are notified that the data within the buffer is invalid and a main memory fetch will be required in order to obtain the most current data. This method, although it does insure that each processor ultimately obtains the most current data requires (a) that the most current data be maintained within the main memory and also (b) that upon each modification of the data that all other processors be notified of the change even though they may not require this data updated. Implementation of this method has proved to be complex, thereby increasing the cost of the computer, as well as degrading the processing speed of the computer.

Still another proposed technique is to provide indicators within main memory showing which buffer memory contains a copy of each individual portion of data. Each time data is read from main memory or written into the buffer memory, the corresponding indicator for that buffer memory is turned on. Also every time a main memory write function is carried out the contents of that corresponding indicator is checked to invalidate the information in the buffer memory which has had its indicator turned on. This technique required that the indicators for the status of each portion of data be maintained within the main memory and that the other processors be cleared each time data is read from the main memory and written into a buffer memory. This technique also greatly increases complexity of the computer system, thereby increasing its cost. It also degrades its speed performance in that the invalidity check must be performed within the main memory upon each fetch from main memory.

It is, therefore, an object of the present invention to provide an improved memory control system for a data processor system with increased speed performance.

It is another object of the present invention to provide an improved memory control system for the simultaneous storage into main memory of modified data from a buffer memory while transferring this data to the requesting user.

It is a further object of the present invention to provide a memory control system which allows the use of the existing main memory data paths for transmitting data between buffer memories.

It is a still further object of the present invention to provide a memory control system which allows the use of the existing control data paths for broadcasting to be utilized for storing data into main memory.

It is a still further object of the present invention to provide a communications system with the other processors of a multiprocessing system which will allow the retrieval of the most current data from another processor's buffer memory, while simultaneously updating main memory in such a manner that it appears to the requesting processor that the data is being fetched from main memory.

SUMMARY OF THE INVENTION

These and other objects of the invention are accomplished in the following manner. When a processor does not find data it requires in its own associated buffer memory, it sends a request to its control unit. A control unit is associated with each processor to interface the processor to the main storage and other control units. The control unit scans all outstanding requests for memory access by means of a first level priority which selects one request for a non busy memory according to the current requestor priority and the list of busy sectors of memory. After a request is selected, it is transmitted to all other control units. After a transmission delay, each control unit will then have the addresses of the requests selected by all the control units. An identical second level priority is then executed simultaneously in each control unit to determine which of the requests is to be serviced. The originating control unit then transmits to main storage the selected request to start the memory cycle. At the same time, the selected request and address is broadcast by each control unit to the processor which it interfaces. As the broadcast is received by the processor, its buffer memory directory must be referenced immediately to determine whether a modified version of the requested data is in the buffer memory. If the broadcast is identified as a fetch request and modified data is located in the buffer memory, the buffer memory must immediately access the data and transmit it to its control unit. The control unit, in turn, places the data on the storage data bus to main memory. In addition, a signal is transmitted to the main memory unit, internally changing the read cycle to a write cycle so that the modified data will replace the data that was in main storage. At the same time, the data is also placed on the storage data out bus and transmitted to the requesting control unit as if it were the result of a normal read cycle. Modified data is thus fetched through main storage from a buffer memory without requiring an additional storage cycle. The following is a list of rules which govern this broadcast activity:

1. All I/O memory accesses are broadcast.

2. All data fetch requests for processors are broadcast.

3. The first store to a block of data which is valid in a buffer memory but not modified in that buffer will cause a new fetch request for the same data so as to initiate a broadcast.

The only main storage activity which will not cause normal broadcast is the case where a replacement in a buffer memory causes modified data to be removed. This case will cause a store from the buffer memory to main memory before the fetch request for the new data is serviced.

All broadcasts must go to all processors except the processor initiating the memory access. There is only one exception to this rule; i.e., when a replacement store occurs, a reverse broadcast is issued back only to the requesting processor, in order that existing controls may be utilized in storing that data into memory.

A feature then of the present invention is the capability of converting the main memory cycle from a read cycle to a write cycle when a broadcast detects modified data in another buffer memory.

These and other objects, advantages and features of the present invention will become more readily apparent from the following specification when taken in conjunction with the drawings.

BRIEF DESCRIPTION OF THE DRAWINGS

Referring to FIG. 1, a multiprocessing system of the form contemplated by the present invention includes a plurality of processors 1, each containing its own buffer memory 2. Each of these processors 1 is connected by its bus 3 to a control unit 6. Control unit 6 controls access and priority of service to the main memory 9, and controls communications with the other control units 6. Each control unit 6 may have connected to it an input/output (I/O) channel 5 connected by a bus 4. Additionally each of the control units 6 is connected to every other one by an inter-control unit bus 7. Each of the control units is also connected to the main memory 9. It should be noted that the processor 1 described in this invention could be a single uniprocessor as well as a more complex pipeline processor that is simultaneously processing a plurality of instruction streams with the instruction streams sharing the resources of the buffer memory 2.

Figure 1:
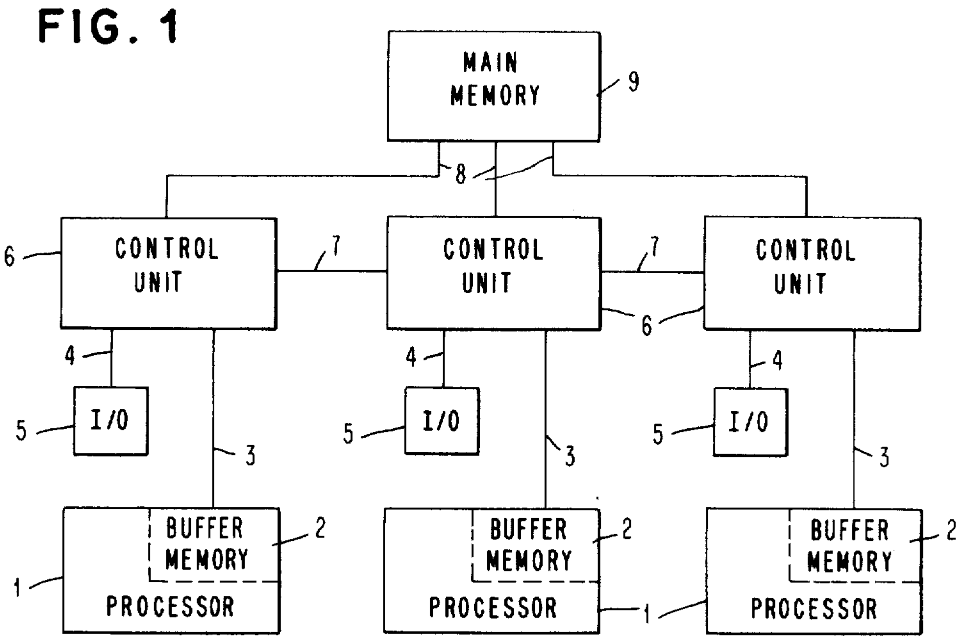
FIG. 1 shows a schematic diagram of the data processing system which employs the present invention.

DESCRIPTION OF THE BUFFER MEMORY:

A more detailed description of the buffer memory 2 of FIG. 1 will now be given with the more detailed drawing in FIG. 2.

Generally, the buffer memory 2 is designed to support the processor 1 by providing storage functions at a speed much greater than that of the main memory 9.

Buffer memory 2 provides storage functions to support processor 1 processing speeds. It supplies copies of the most recently used data to the processor 1, stores away updated blocks, maintains records consisting of the status and disposition of data, and communicates its activities to other buffer memories 2 via the broadcast mechanism. As shown in FIG. 2 the principle components of buffer memory 2 are the primary storage module called the cache 200, and the directory 204.

Although the buffer memory 2 may be organized in various ways, the buffer memory 2 embodiment of this invention comprises 4 basic storage modules (BSMs) of 8,192 bits each in the cache 200. Each BSM is divided into left and right segments, and into 512 partitions. Each partition is 16 bytes, 8 associated with each segment in cache 200. The partition represents a direct mapping between buffer memory 2 and main memory 9. A block in main memory may reside in either of the 2 block segments for that partition in cache 200. This mapping scheme is termed, two-way set associative. It will be obvious to those skilled in the art that many types of mapping schemes might be employed in the buffer memory 2 and that this invention is not restricted to this type of mapping.

The system architecture of the present embodiment utilizes a system address, bits 8–31, which identifies the partition by bits 8–26, the BSM by bits 27–28 and the byte by bits 29–31. The segment is identified by comparing system address 8-17 with the contents of a directory 204 which is organized with similar parameters as cache 200. The cache accepts real addresses only. Logical addresses must be translated first. However, since the translation of addresses might be accomplished in many ways, known to those skilled in the art, and since address translation per se is not a part of the present invention this translation will not be discussed. Suffice it to say that the address translation has been accomplished and only real addresses are input to the buffer memory 2.

The cache 200 is used to hold the subset of main memory data currently being used by its associated processor 1. As noted above, it will be obvious to one skilled in the art that this storage could be used by a plurality of instruction streams if the processor 1 happens to be a pipeline processor which was simultaneously processing a plurality of instruction streams with the instruction streams sharing the resources of the processor 1.

The directory 204 is a table of contents that identifies and classifies data stored in the cache 200. The directory 204 maintains a copy of each resident block address and provides searches for all data fetches from cache 200. Although only one directory 204, within a buffer memory 2, is shown, it should be recognized that in some situations it might be desirable to have two directories, one for store and broadcast searches, and another for fetch searches. This would be particularly desirable in the case where processor 1 was a pipeline processor operating on more than one instruction stream. By so utilizing two directories simultaneous searches of the directories might be accomplished realizing increased bandwidth capabilities.

Figure 3:
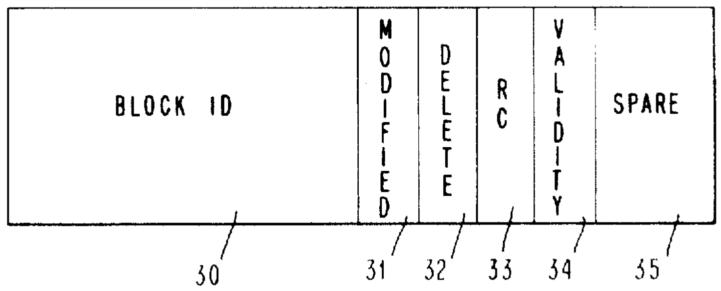
FIG. 3 shows a diagram of the format of the data within the directory.

The directory 204, is similar in organization to cache 200. There is one 16 bit entry per cache block. The directory 204 partition address bits are the same as cache 200, discussed above. Referring to FIG. 3 the 16 bits in each entry in the directory 204 contains the following fields:

1. 10 block ID bits 30, which correspond to system address 8–17 and identify to main storage block resident in that corresponding cache 200 entry.
2. One modified bit 31, indicates that the block resident in that cache entry has been altered by the program.
3. One delete bit 32, that denotes that this block will not be replaced.
4. One RC bit 33, used to decode the segment to be replaced if a directory miss occurs during an access.
5. One validity bit 34, indicates that a main storage block is resident in a cache block.
6. 2 spare bits 35.

The modified bit 31 and validity bit 34 provides validation means to insure only a single valid modified version of data may exist within one of the buffer memories. 2. How this is accomplished will be explained in the operation section, below.

Figure 2:
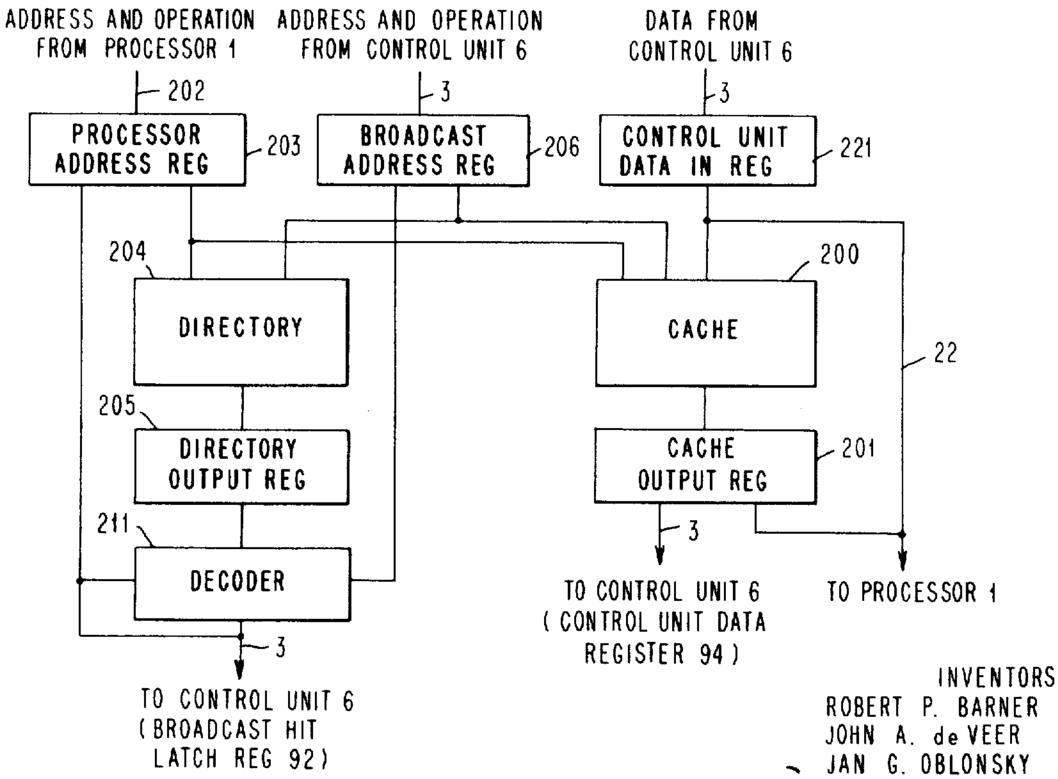
FIG. 2 shows a schematic diagram of the buffer memory unit which is utilized in the present invention.

Also shown in FIG. 2 is the processor address register 203 which receives address and operational requests from processor 1 over bus 202. This register is connected to directory 204 and cache 200 in order to provide a means to input received information into these units to perform the necessary search for the requested data. Also connected to the cache 200 and directory 204 is the broadcast address register 206 which receives address and operation information from its control unit 6 during a broadcast operation over bus 3. Directory output register 205 is provided to receive the output of directory 204 resulting from a search of the directory 204 while decoder 211 is utilized to decode the status of the data within the cache 200. That is the decoder 211 is utilized to determine whether the data is valid and whether it has been modified. Cache output register 201 is provided to receive the output of cache 200, while control unit data IN register 221 connected to cache 200 provides a means to receive data from control unit 6. Bypass bus 22 is provided to allow a means for the buffer memory 2 to simultaneously provide the data received from control unit 6 to processor 1 as the data received from control unit 6 is being stored into cache 200.

In the patent application of L. J. Boland et al, U. S. Pat. No. 3,588,829 for "Integated Memory System with Block Transfer to a Buffer Store," filed Nov. 14, 1968, and assigned to the same assignee as this case, there is disclosed a buffer memory which is functionally equivalent to the buffer memory described herein.

DESCRIPTION OF CONTROL UNIT

Essentially the control unit 6 is the interface between the processor 1 and main memory 9 and also with other processors 1. Every control unit 6 also forms an interface between the I/O units 5 and main memory 9 as well as provides control and communications between various parts of the multiprocessing system. The functions performed by the control unit 6 can be grouped into three categories; i.e., request handling logic, data bussing to main memory 9, and data return from main memory 9. Within these areas the control unit 6 controls time sharing of main memory 9 between and within processors 1; establishes priority and resolves conflicts in the contention for main memory 9 access; determines the selection and addressing of main memory 9; and controls reconfiguration of the multiprocessing system in response to system requirements.

Figure 4:
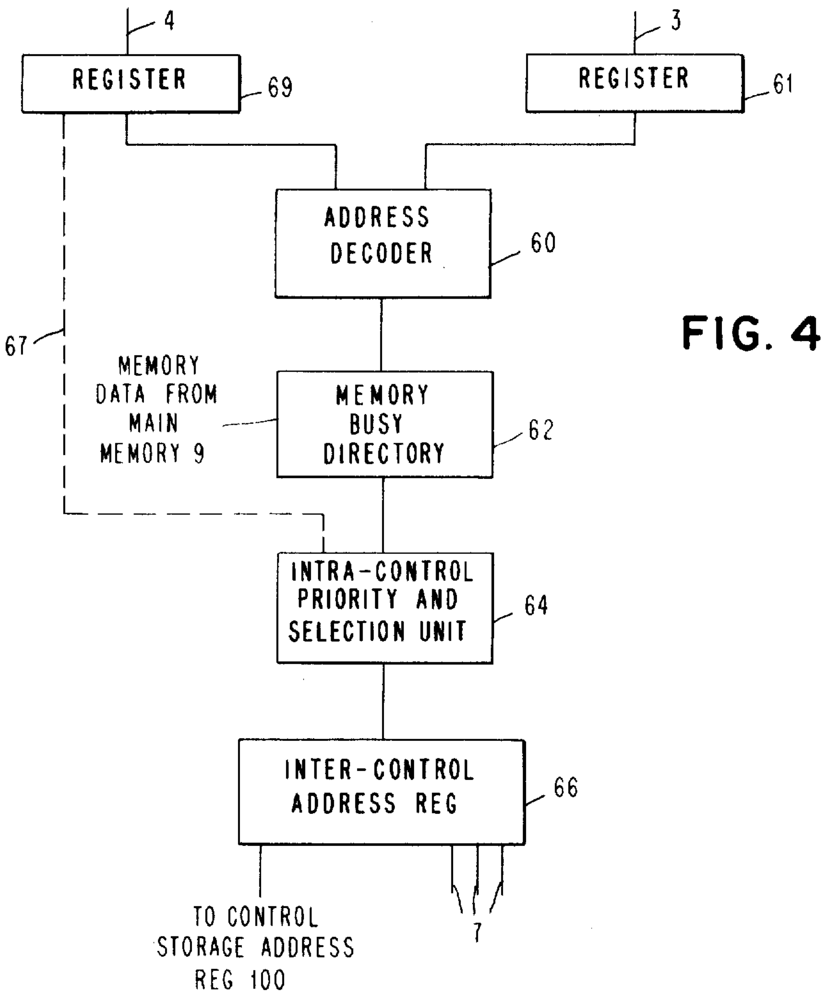
FIG. 4 shows a schematic diagram of the apparatus within the control unit that is utilized to determine intra-control unit priority.

FIG. 4 shows how the control unit 6 performs the function of intra-control unit priority. Requests for access to main memory 9 arrive from its associated processor 1 over bus 3 to register 61 and from its associated I/O units 5 over bus 4 to register 69. Each request includes the location in main memory 9 and the operation to be performed. This information is decoded in address decoder 60 and is checked against a memory busy directory 62 to insure that the memory area requested is not busy. When usable addresses have been determined for memory, the requests are submitted for priority determination. Where I/O units 5 have the ability to perform this address decoding and memory busy directory search internally, then a bypass of this function may be provided as shown by dotted bus 67. When usable address 5 have been determined for memory, the requests are submitted for priority determinations.

A detailed disclosure of an address decoder of the type used herein is disclosed in the application of A. P. Mullery, et al, U.S. Pat. No. 3,293,615, filed June 3, 1963 for a "Current Addressing System," and a memory busy directory of the type utilized herein is disclosed in the application of R. T. Blosk, et al, U.S. Pat. No. 3,231,862 filed Dec. 30, 1960 for "Memory Bus Control Unit" both of which are assigned to the assignee of this application.

Priority between the processors 1 and their I/O units 5 is set in the intra-control priority and selection unit 64. Obviously if a processor 1 was a processor operating on more than one I-Stream, priority would also have to be determined in the intra-control priority and selection unit 64 between the various I-Streams as well as between the various I/O units 5. When final selection of request is made the associated address information is inputted into the inter-control address register 66. The output information from an inter-control address register 66 is available to other control units 6 over the inter-control unit busses 7 and to the control storage address register 100, which will be discussed below.

Figure 5:
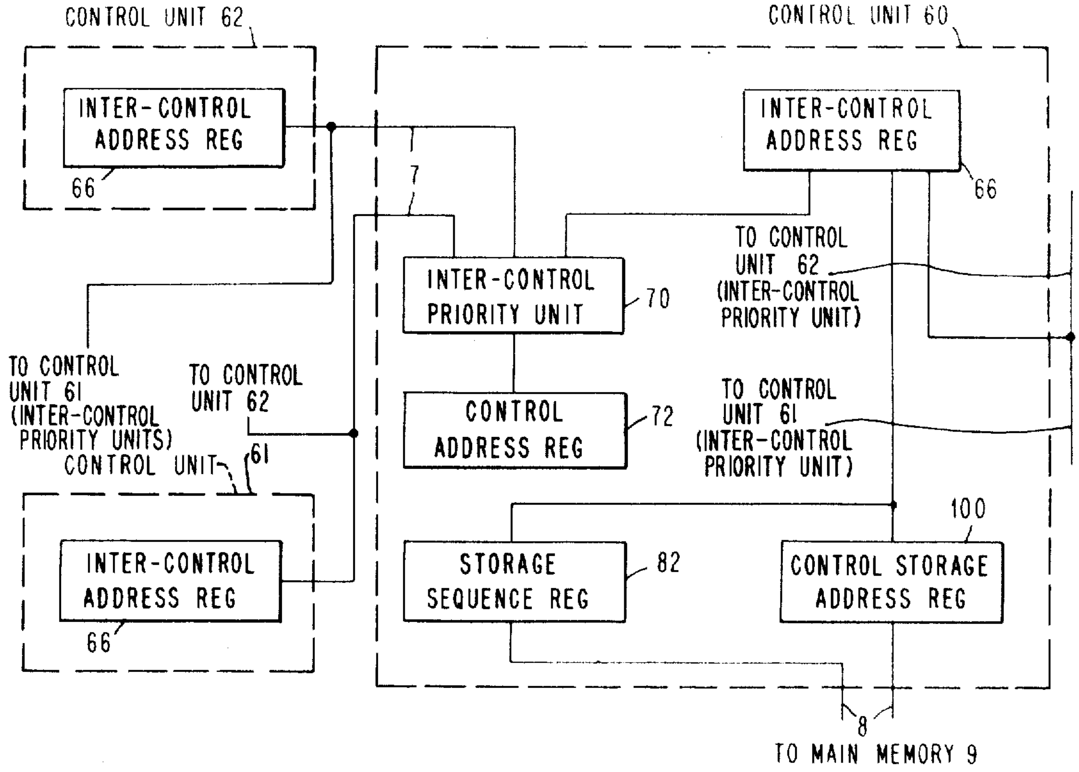
FIG. 5 shows a schematic diagram of the apparatus utilized to perform inter-control unit communications.

FIG. 5 illustrates the communication of selected request address information for a control unit 6 configuration such as that shown in FIG. 1. The subscripts 0, 1 and 2 identify elements within the several control unit $6_0$, control unit $6_1$ and control unit $6_2$, respectively. For inter-control communication, it is necessary that the three control units 6 be synchronized, thereby assuring that the intra-control priority selection results, described above, although developed in each control unit 6 independently, are made available to all control units 6 over the inter-control unit bus 7 simultaneously. Thus the information set in each inter-control address register 66 is available both to the inter-control selector in its own control unit 6 and to all other control units 6 as well.

FIG. 5 also shows the apparatus used in making a determination as to which control unit 6 gets priority for its request to access main memory 9. The results of the intra-control priority selection, discussed above, is submitted to all three inter-control priority units 70 at the same time. The data is transferred from inter-control address register 66 to each control unit 6 over bus 7 to each inter-control priority unit 70 in each other control unit 6. Priority among the three requests is established in a manner similar to that for the intra-control unit priority system already described. Thus, priority might be given first to I/O requests, then to processor requests. When contention among the three control units exist, (e.g. all contain processor requests) the priority selection scheme might be based upon any type of a scheme which rates the processors in a predetermined relative order of priority.

When the selection has been made by inter-control priority unit 70 the control unit 6 which originated the selected request gates the contents of its inter-control address register 66 into its control address register 72. Simultaneously, the other two control units 6 gate over the inter-control unit bus 7 the contents of the selected inter-control address register 66. At completion of the selected function then, the contents of all three control address registers 72 are identical and available for determining the need for broadcasting to the processors 1 associated with the respective control unit 6. In addition, the contents of the selected inter-control address register 66 are gated into its respective control storage address register 100 to become available for transmission to memory.

FIG. 5 also shows the manner in which a memory request interface is performed. After the inter-control priority selection is completed, as described above, the contents of inter-control address register 66 are gated into the control storage address register 100 and into the storage sequence register 82. The storage sequence register 82 receives the portion of the address information needed to select the storage distribution element in main memory 9. Storage sequence register 82 and control storage address register 100 are connected to main memory 9 by bus 8 and provide the means necessary to initiate the main memory 9 operation.

A priority control unit capable of performing the above intra control priority and inter control priority functions is disclosed in the application or A. Podvin et al, U.S. Pat. No. 3,611307, filed Apr. 13, 1969, for an "Execution Unit Shared by a Plurality of Arrays of Virtural Processors" which is assigned to the same assignee of this application.

Figure 6:
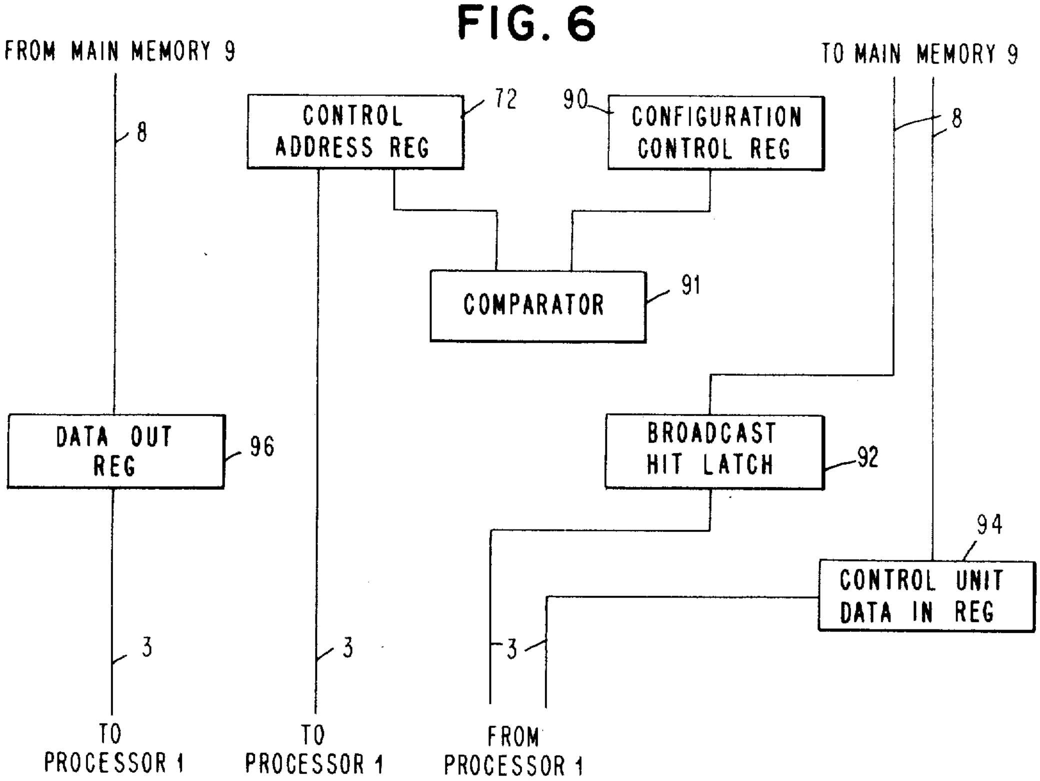
FIG. 6 shows a schematic diagram of the apparatus within the control unit that is utilized for broadcast control.

FIG. 6 shows the operation of the broadcast control within each control unit 6. As described above at the completion of the selection function the control address register 72 contains the address and operation of the data within main memory 9. Configuration control register 90 provides a predetermined setting which determines the range within main memory 9 that the processor 1 and I/O units 5 that are associated with the particular control unit 6 may access. Comparator 91 allows the comparison of the control address register 72 with the setting within the configuration control register 90 prior to the broadcast operation in order to determine whether the address which is being desired could be resident within the buffer memory 2 associated with the particular control unit 6. That is, if the address that is desired within main memory does not fall within the range of the setting within configuration control register 90 it is not necessary to broadcast the address to the buffer memory 2 because this address could not be resident within buffer memory 2 since processor 1 does not have access to this particular area of main memory 9. Those skilled in the art will recognize that this configuration control register 90 may easily be omitted without impairing the operation of the present invention. Without the configuration control register 90 and comparator 91 it would merely be necessary to broadcast all addresses from all control units 6. In the event that a particular processor 1 cannot access the requested area within main memory 9 it would merely mean that for that particular broadcast there is no possibility of obtaining a hit within the particular buffer memory 2.

Broadcast hit latch 92 within control unit 6 provides a means to indicate whether a broadcast has resulted in a hit and that, therefore, there is valid modified data within the buffer memory 2. It also provides means to convert the main memory cycle to a write cycle. The broadcast hit latch 92 is connected via bus 3 to the decoder 211 within buffer memory 2 and is set when a broadcast results in a hit within cache 200. Control unit data register 94 provides a means for receiving the data from the buffer memory 2 over bus 3. Both the broadcast hit latch 92 and the control unit data register 94 are connected to main memory 9 by bus 8. Data output register 96 is used to receive data from main memory over bus 8 and is connected to processor 1 over bus 3.

OPERATION

The operation of the present invention will now be described. Referring to FIG. 2 a processor request is received by processor address register 203 over bus 202 containing the address and operation desired. The contents of register 203 are simultaneously gated into cache 200 and directory 204. The block ID 30 of the data block is read out of the directory 204 along with the validity bit 34 and the modified bit 31 into directory output register 205. The block ID 30 is compared with the requested address in decoder 211 to determine whether or not the data to be fetched is resident in the cache 200. If the data is resident in the cache, based upon the comparison performed within decoder 211, and is valid, based upon the state of validity bit 34, it will be gated to processor 1 regardless of whether it has been previously modified. That is, the data which has previously been gated to cache output register 201 simultaneously with the search of directory 204 will be gated over bus 3 to processor 1.

If the requested data is not located in cache 200 a fetch request for the desired data must be issued to the control unit 6. This is accomplished by gating the contents of processor address register 203 over bus 3 to register 61 of FIG. 4. The control unit 6 decodes the information in address decoder 60 to determine the main memory operation that is desired. The address is then checked in memory busy directory 62 to insure that the memory area requested is not busy. The intra-control priority and selection unit 64 next selects the priority of the requests pending and outputs the address and operation of the selected operation into inter-control address register 66. The inter-control address register 66 then outputs the information to all other control units 6 over the inter-control units bus 7 and to the control storage address register 100. The data is also transferred from inter-control address register 66 in each control unit 6 over bus 7 to each inter-control priority unit 70 in each other control unit 6. Priority is then determined among the requests from each control unit 6 by inter-control priority unit 70. All control units 6 perform this operation simultaneously. When the selection has been made the control unit 6 which originated the selected request gates the contents of its inter-control address register 66 into its control address register 72. Simultaneously the other two control units 6 gate over the inter-control unit bus 7 the contents of the selected inter-control address register 66. At the completion of the selection function then, the contents of all three control address registers 72 correspond to their respective control units 6 are identical for the purpose of determining the need for broadcasting to the processor 1 associated with each control unit 6. Simultaneously with this operation, the contents of the selected inter-control address register 66 is gated into its respective control storage address register 100 to become available for transmission to memory.

Concurrent with the transfer of the data from the control storage address register 100 over bus 8 to initiate the main storage operation, the data within control address register 72 is compared with the setting within configuration control register 90 in comparator 91 to determine whether the selected address might be resident in the buffer memory 2 associated with each control unit 6. If a match is found, the contents of the control address register 72 are broadcast to the processor 1 for which there is a match over bus 3. It should be emphasized that this broadcasting activity is being accomplished by all control units other than the control unit 6 whose processor 1 initially instituted the main memory operation.

The address and operation information is received by the buffer memory 2 over bus 3 into broadcast address register 206. The contents of register 206 are then simultaneously input into the cache 200 and directory 204. The output of directory 204 which appears in directory output register 205 is compared in decoder 211 with the contents of broadcast address register 206 to determine the status of the requested address. When there is a hit in the buffer memory 2, that is, the desired data is found to exist within the buffer memory 2 a determination must be made by decoder 211 as to what action should be taken. This will depend both on the validity of the data, whether it has been modified and the type of operation that is desired. Associated with the broadcast data are control bits identifying the original operation as a store or a fetch. Where the directory search indicates that there is no address match no action is required by the decoder 211. Where there is a match between the directory contents and the requested address, and the data within the cache 200 is indicated by modification bit 31 to have not been modified, two possibilities exist. If the operation broadcast is a store operation it will be necessary to invalidate the data within cache 200. This is accomplished by invalidating validity bit 34. If a broadcast operation, however, is a fetch operation it will be required to take no action on the data within cache 200.

If the comparison between the directory data and the broadcast data indicates that there is a match and that the data within cache 200 has been modified it will be necessary to invalidate the entry within directory 204 for this data and to send the data to the requesting processor.

These steps are necessary to insure that only one copy of modified data can possibly exist outside of main memory.

Assuming that a hit does occur within a buffer memory 2 and the data is to be sent to the requesting processor the following would occur. The decoder 211 would gate a signal to control unit 6 over bus 3. More specifically, it would gate a signal to broadcast hit latch 92. Concurrent with this signal it would gate the requested data out of cache output register 201 over bus 3 to control unit data register 94 in control unit 6.

The above described broadcast activity to the processors 1 has been accomplished while the main memory has been initiating a read cycle for the data. For the purpose of describing the embodiment of this invention, the main memory 9 is a destructive readout type which will require a read cycle followed by a write cycle in order to reinsert the data that was destroyed during the previous read cycle. When main memory 9 senses that the broadcast hit latch 92 has been set within a control unit 6 it converts its operation into a storage cycle. That is, when main memory 9 detects that a broadcast hit 92 has been set it brings up a memory store cycle and gates the data contained in control unit data in register 94, for the control unit whose broadcast hit latch has been set, into main memory over bus 8. Main memory 9 then stores this data into the requested main memory address location while simultaneously transmitting the same data over bus 8 to the data out register 96 of the control unit 6 that originally requested the data. In this manner, the data received by the requesting control unit appears to be the data which would normally have been obtained from normal memory fetch. The control unit 6 then transmits the contents of its data out register 96 to its processor 1 over data bus 3 to complete the operation.

While the invention has been particularly shown and described with reference to the preferred embodiment thereof, it will be understood by those skilled in the art that various changes in form and details may be made therein without departing from the spirit and scope of the invention.

What is claimed is:

1. A memory control system in a data processing system with a main memory and a plurality of data processors, each processor having the capability to modify data, and including its own buffer memory unit in which to retain data comprising:

system control means;

circuit means associated with said control means for selectively connecting said main memory to each of said plurality of data processors;

first means within said control means for initiating a query on behalf of a requesting data processor regarding the availability of requested data in said main memory;

second means within said control means for initiating a second query regarding the availability of a modified version of the requested data within any one of the aforesaid buffer memory units;

validation means within said buffer memory unit for indicating, in response to the second query, the one of the aforesaid buffer memory units containing the modified version of data;

third means within said control means for initiating a data retrieval from said main memory to the requesting data processor concurrent with the second query to each of the aforesaid buffer memory units;

means within said control means for detecting the state of said validation means;

means controlled by said detecting means for interrupting the initiated main memory data retrieval fetch function said initiating a main memory data store function when the state of said validation means indicates that one of the aforesaid buffer memory units contains the modified version of data; and means operable concurrently with said interruption means for transmitting the modified version of data from the buffer memory unit so containing the modified version of data to the buffer memory unit of the requesting processor and simultaneously therewith to said main memory.

2. The apparatus of claim 1 wherein each of said plurality of data processors includes at least an input/output channel and a uniprocessor.

3. The apparatus of claim 1 wherein said data processors are a plurality of processors within a multiprocessing computer system.

4. The apparatus of claim 3 wherein said second means initiates said query to all buffer memory units other than to the buffer memory unit of said requesting processor.

5. The apparatus of claim 4 wherein said second means initiates said query to buffer memory units consequent upon the unavailability of said requested data in a valid form in the buffer memory unit of said requesting data processor.

6. The apparatus of claim 5 wherein said validation means comprises a validity bit stored in a directory associated with each portion of said data in each of said buffer memories to indicate whether the data is valid.

7. The apparatus of claim 6 wherein said validation means further comprises a modified bit stored in a directory associated with each portion of said data in each of said buffer memories to indicate whether the data has been modified by said data processor.

8. The apparatus of claim 7 wherein said control means comprises a plurality of control units each connected to a data processor, the main memory and the other control units associated with other data processors.

9. The apparatus of claim 8 wherein said control unit associated with said requesting data processor operates simultaneously with the operation of the other control units when broadcasting its requesting data and initiates said data retrieval from main memory.

10. The apparatus of claim 9 wherein said control unit associated with said buffer memory, wherein a modified version of data was indicated, further contains means to control said conversion of said data retrieval to a data storage of said modified data into main memory and means to transmit said modified data to the requesting processor.

11. The apparatus of claim 10 further comprising means to query only the requesting data processor when a store operation is desired to main memory from said requesting data processor's buffer memory.

12. The apparatus of claim 11 further comprising means within said control units to determine whether the requested data is located in its associated buffer memory.

13. A method of obtaining data in a data processing system which contains multiple users each with its own buffer memory unit comprising the steps of:

1. Requesting the data from main memory when not available in a requesting processor's own buffer memory,
2. Initiating a read cycle of main memory for said requested data,
3. Querying processors buffer memorys for a modified version of requested data concurrent with said initiation of a read cycle,
4. Detecting a modified version of data in one of said buffer memorys.
5. Converting said read cycle to a write cycle when modified data is discovered as a result of said query,
6. Writing said modified data into main memory.
7. Transmitting said modified data to said requesting processor concurrently with said writing.

* * * * *